Nov. 17, 1959     R. BECKNELL     2,913,082
FRICTION CLUTCHES

Filed June 4, 1956     2 Sheets-Sheet 1

INVENTOR.
RALEIGH BECKNELL
BY
Joseph A. Rave
Attorney

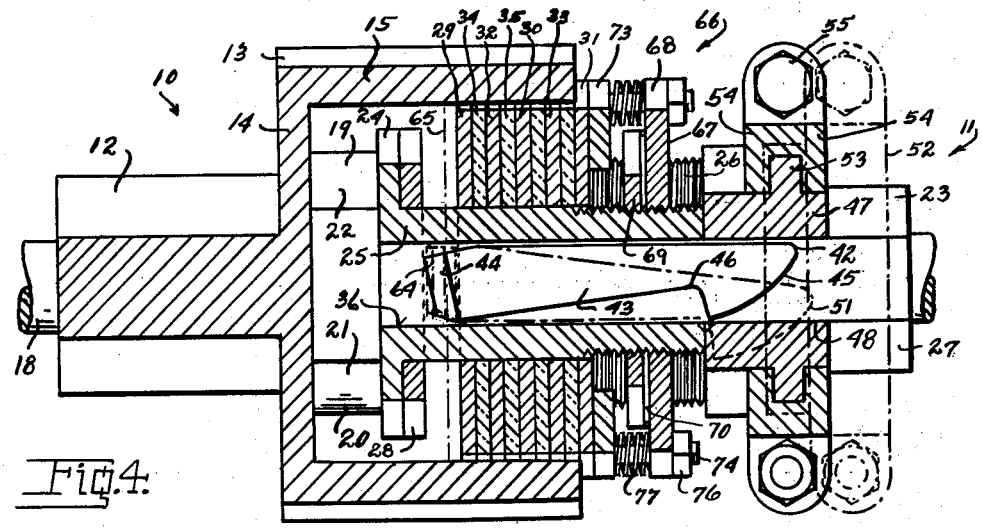
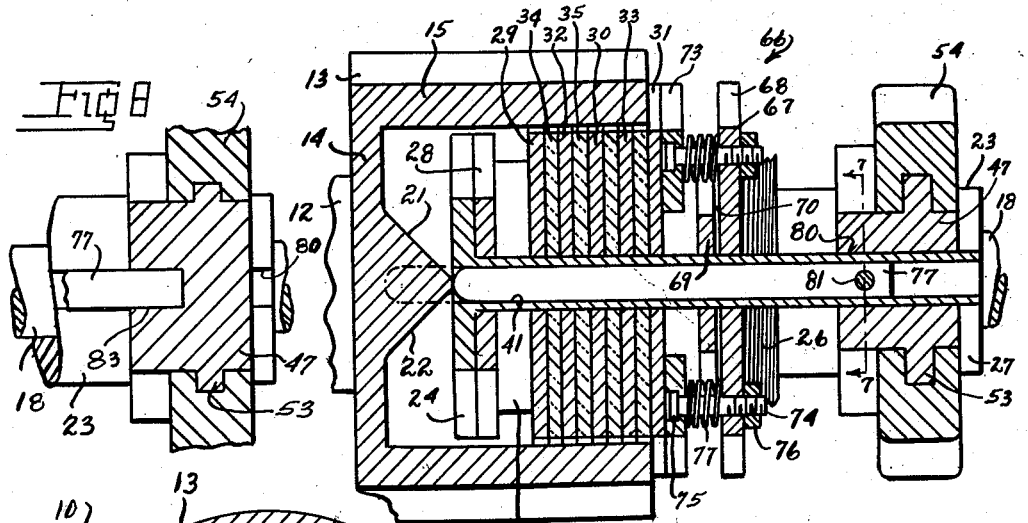
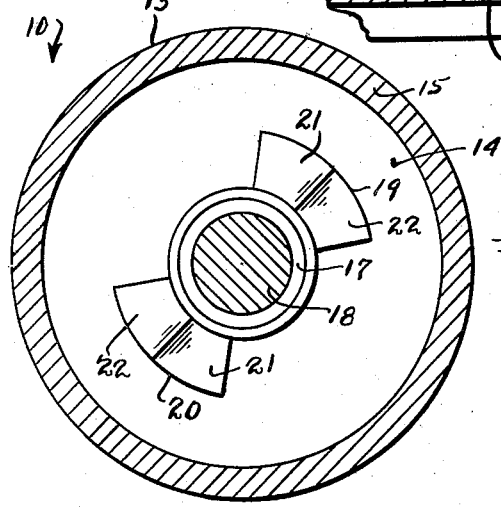
INVENTOR.
RALEIGH BECKNELL

United States Patent Office 2,913,082
Patented Nov. 17, 1959

2,913,082

FRICTION CLUTCHES

Raleigh Becknell, Cincinnati, Ohio, assignor to The Conway Clutch Company, Cincinnati, Ohio, a corporation of Ohio Application June 4, 1956, Serial No. 589,201

4 Claims. (Cl. 192—56)

This invention relates to improvements in a friction clutch, particularly to improvements in the type that is adjustable to a torque load before automatic disconnection upon overloading.

Friction clutches of this specific type are well known and is not new, per se, in this application.

In the past, the means for actuating the clutch at the overload point, or amount of torque transmitted therethrough, was not quite as positive as desired in certain instances. Furthermore the adjusting and wear take up means was operable only in increments, which, while generally acceptable, were not the most desirable at critical points of torque overload, or adjustment to compensate for minute wear.

The present invention discloses a mechanism that permits of the adjustment of the torque overload point, and the take up for wear, to be effected through minute amounts to maintain the clutch at the desired point at all times and discloses positive and quick acting means for disconnecting the clutch members.

It is, therefore, the principal object of the present invention to provide, in a friction overload clutch, simple yet highly efficient means for disconnecting the clutch members upon reaching the overload or preadjusted torque load point.

It is, also, an object of the present invention to provide, in a friction overload clutch, adjusting means for positioning the friction plates at the most desirable overload point.

Another object of this invention is the provision of a clutch overload clutch plate adjusting means that can be readily operated and locked with a minimum of effort in its adjusted positions.

A still further and specific object of the present invention is the provision of a knock out rod or rods for a friction clutch that are operated to positively disconnect the clutch members within a fraction of a revolution upon reaching the overload point of the clutch and in which the clutch may be minutely adjusted to obtain the desired results from the clutch.

Other objects and advantages of the present invention will be readily apparent by reference to the following specification considered in conjunction with the accompanying drawings forming a part thereof, and it is to be understood that any modifications may be made in the exact structural details there shown and described, within the scope of the appended claims, without departing from or exceeding the spirit of the invention.

In the drawings:

Fig. 4 is a longitudinal sectional view through the clutch, similar to Fig. 1, taken through a plane between the axis thereof and its upper end as seen from line 4—4 on Fig. 2.

Fig. 5 is a longitudinal sectional view through the clutch, similar to Fig. 1 and, taken through a plane angularly of that of Fig. 4, as seen from line 5—5 on Fig. 2.

Fig. 6 is a vertical sectional view through one of the clutch housings as seen from line 6—6 on Fig. 1.

Fig. 8 is a cross-sectional view of a modification in the construction, in so far as the connection of the knock out rods with the slider is concerned, and as would be seen from a line on such modification as from line 8—8 on Fig. 7.

Throughout the several views of the drawings similar reference characters are employed to denote the same or similar parts.

Figure 1:
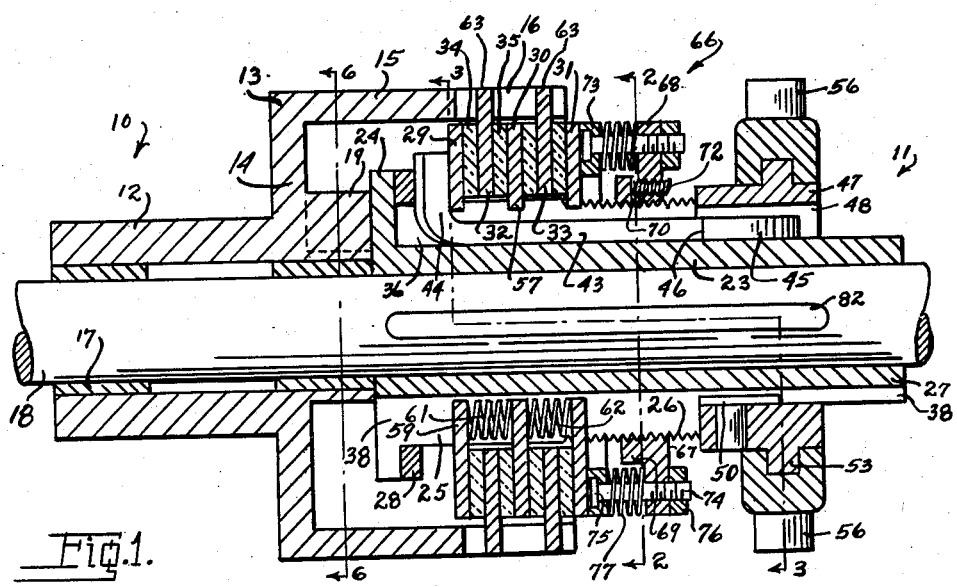
Fig. 1 is a longitudinal sectional view through a clutch embodying the improvements of the present invention as seen, in general, from line 1—1 on Fig. 2; certain parts in Fig. 1 being illustrated in elevation for clearness in disclosure.

The clutch of the present invention comprises a pair of clutch members, respectively indicated by reference numerals 10 and 11, with said members having associated therewith the drive and driven clutch elements. The clutch member 10 may be considered, for the purpose of description, as the clutch driving member while the clutch member 11 may be considered as the clutch driven member. It is to be understood that the motive power, a pulley, a gear, a chain sprocket, or the like, may be attached to either clutch member thereby making same the driver and the remaining clutch member the driven.

The clutch member 10 comprises a sleeve 12 having at one end an enlarged cup-like receptacle 13. The receptacle 13 comprises a base 14 integral with and radially of the sleeve 12 with a flange 15 outwardly projecting from the periphery of the base 14. The flange 15 is provided inwardly of its free edge, at spaced points therearound, with slots 16; there is shown in the drawings four such slots but it is to be understood that this number may be increased or decreased depending upon the size and power to be transmitted through the clutch. The clutch member 10 is provided interiorly of its sleeve 12 with bushings 17 whereby it is freely mounted and rotated on a shaft 18.

The receptacle base 14 has inwardly extending therefrom a pair of projections 19 and 20, each substantially triangular in cross section, as clearly illustrated in Fig. 5, with each projection having angular sides 21 and 22 which act as cams as will later be made clear.

The driven clutch member 11 includes a body portion 23 having at its inner end a radial flange 24 which, as will presently be made clear, constitutes the clutch thrust member.

Forwardly of the flange 24 the clutch member body portion 23 is provided with an enlarged central portion 25, generally circular in cross section, and terminating at its outer end in threads 26. Further, forwardly of the said enlarged central portion 25 the clutch member body portion 23 is provided with a sleeve like extension 27.

It should be here noted that the power transmitting member, a gear, pulley, or the like, may be keyed or otherwise secured to the sleeve 12 of the clutch member 10 for making such clutch member the driver, or the sleeve 27 of the clutch member 11 may be extended to have secured thereto the said power transmitting element, gear, pulley, or the like.

Mounted on the clutch member 11 central portion 25 and lying against the face of the flange 24 is a thrust bearing plate or ring 28. The said clutch member 11 on its said central portion 25, also, has slidably mounted thereon alternate clutch friction plates with, as disclosed herein, clutch plates 29, 30 and 31, constituting the driven plates while the intermediate plates 32 and 33 constitute the driving plates.

Each of the driving plates plates 32 and 33 is faced on its opposite sides with a friction material plate 34 and 35, such as asbestos with said asbestos facings being riveted to its plate to form a unitary construction therewith.

It is to be understood that additional driven and driving plates may be employed with said plates alternating, respectively, and attached to their respective clutch body member, as will presently be made clear.

Figures 2, 3:
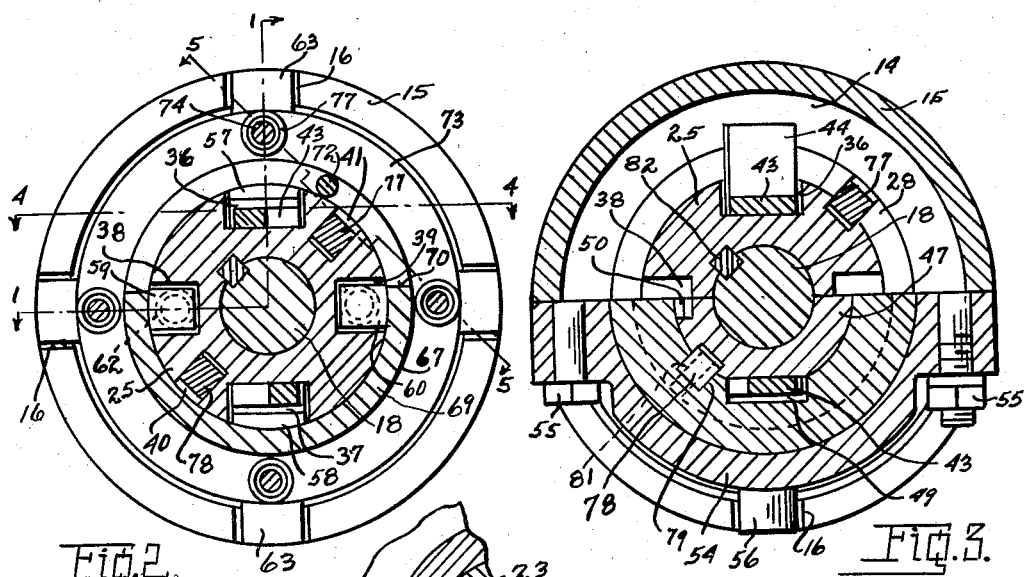
Fig. 2 is a transverse sectional view through the clutch as seen from line 2—2 on Fig. 1.
Fig. 3 is a transverse sectional view through the clutch of Fig. 1 taken through planes ahead of and behind the plane of Fig. 2, as seen from line 3—3 on said Fig. 2.

The clutch member 11 has its body portion 23 provided with longitudinal passageways, in the form of keyways, there being illustrated in the drawings passageways 36 and 37 at diametrically opposite points, and passageways 38 and 39, again at diametrically opposite points and respectively intermediate the passageways 36 and 37 and passageways 40 and 41, again at diametrically opposite points. As seen in Fig. 2, the passageway 36 and 37 are relatively wide by comparison to their depth. Disposed in each said passageway is a clutch plate actuating lever illustrated most clearly in Fig. 4 and since said levers are substantially identical, it is deemed sufficient if but one of them is specifically identified and described.

As seen in Fig. 4 the clutch plates actuating lever 42 comprises an elongated body portion 43 having an upstanding finger 44 at one end and a cam face 45 at its other end. The body portion 43 is reduced as at 46 immediately adjacent the cam face 45.

In practice, and as seen in Fig. 1, each clutch plate actuating lever 42 is mounted on the base or bottom of its passageway 36 or 37 with its upstanding finger 44 disposed between the thrust bearing plate or ring 28 and an adjacent friction clutch plate, plate 29 for example.

Disposed on the sleeve 27 of the clutch member body portion 23 is the clutch control member or slider 47. The slider 47 is provided at diametrically opposite points with passageways 48 and 49 which are respectively aligned with the passageways 36 and 37 of the clutch member body portion 23. Said slider 47 in order to maintain said alignment, is provided with a key 50 adapted to ride in one of the passageways 38 and 39 in said clutch member body portion 19.

In practice and with the clutch plates disconnected the actuating levers 42 each has a position such as illustrated in phantom lines at 51 in Fig. 4. At this time the slider 47 is in a withdrawn position, as illustrated in phantom lines in Fig. 4 and indicated by the reference numeral 52.

In order to shift the slider 47 between its clutch operative position, shown in full lines in the drawings, and its clutch inoperative position, the said phantom line 52 position, the slider 47 is provided, intermediate its ends, with a radial flange 53 adapted to be received in a groove in a shifter 54 which, as illustrated in Fig. 3, is formed of two separable halves joined to one another through bolts and nuts 55, one on each side thereof. Each half of the shifter has projecting therefrom a circular boss 56 for connection with a clutch shifter lever, not shown.

Each of the driven friction plates 29, 30 and 31 has inwardly projecting from its bore a plurality of lugs with two opposed lugs 57 and 58 extending into passageways 36 and 37 but stopping short of the clutch plates actuating levers 42, as illustrated in Fig. 2.

Additionally, and extending inwardly of each of said driven plates 29, 30 and 31 are lugs 59 and 60 which project into passageways 38 and 39 stopping short of the base or bottom of said passageways. Said last mentioned lugs 59 and 60 of the plates 29, 30 and 31 respectively form abutments for springs 61 and 62 which are located in the passageways 38 and 39, and the function of which springs will presently be made clear.

It will be noted that the driven friction plate 30 forms on one side thereof an abutment for spring 61 and at the same time forms on its opposite side an abutment for spring 62 with said spring 61 having its other abutment with the plate 29 while the spring 62 has its other abutment formed by the plate 31.

As was noted above, each of the driving plates 32 and 33 is a composite plate formed from a steel central plate and friction side faces riveted thereto; said friction material is of the form commonly used in this connection and takes the form of, what is commonly known as hydraulically pressed asbestos brake material. The said driving friction plates 32 and 33 each has outwardly projecting from its periphery a plurality of lugs 63 there being as many such lugs 63 as the clutch member flange 15 has slots or notches 16 and with a lug 63 in each slot or notch.

In practice the shifting of the slider 47 from its phantom line position 52 to the solid line position thereof actuates each of the clutch levers 42 from its phantom line position 51 to its solid line position thereby actuating the finger 44 of the lever 42 from its phantom line position 64 to its solid line position and shifting the clutch plate 29 from its phantom line position 65 to its solid line position and thereby effecting a driving connection between the driven plates 29, 30 and 31, and the driving plates 32 and 33.

The shifting of the clutch plates is effected by a corner of the upstanding finger 44, upon the actuating of said finger as above set forth, against the thrust bearing plate or ring 28 for compressing the clutch plates against an adjustable nut or thrust member assembly, indicated in the drawings in its entirety by the reference numeral 66.

The thrust member assembly 66, as herein illustrated, comprises a cylindrical nut 67 threadedly carried by the driven clutch member sleeve. The nut 67 is provided at one side thereof with an outward radial flange 68, a body portion 69, and intermediate the body portion and the flange with a vertical slot 70 vertically of its axis and with said slot stopping short of said nut axis as clearly illustrated in Fig. 2. The nut 67 is thereby provided, in effect, with a wing like portion, the radial flange 68, to one side of its body portion 69. Carried by the nut 67, below the perimeter of the body portion 69 is an Allen head dog screw 72 having its inner end in abutment with said body portion 69.

The said thrust member assembly 66, in addition, includes a thrust ring 73 arranged to be engaged by the driven friction plate 31. The thrust ring 73 is connected with the thrust nut radial flange 68 by a plurality of similar bolts 74, each having a head 75 at one end each disposed in a receiving socket in the thrust ring 73 and said bolts 74 each has threaded on its other end a nut 76. Disposed on each bolt 74 and located between the thrust ring 73 and nut radial flange 68 is a spring 77' under compression as effected by the adjustment of the nut 76 on the bolt 74.

In practice the nut 67 is actuated toward the clutch member flange 24 to the point that with the clutch plates actuating levers 42 in the solid line position of Figs. 1 and 4 the desired torque is transmitted between the clutch members 10 and 11, whereupon the lock screw 72 is actuated for outwardly actuating the thrust nut flange 68 and clamping the nut threads thereof on the clutch member body threads 26.

In practice the thrust member assembly 66 is adjusted to the point it is desired in accordance with the load to be transmitted. When this load point is reached the clutch members are automatically shifted to disconnect the driving and driven clutch plates from one another. A fraction of a revolution of one or the other of the clutch members is necessary before the said automatic disconnection of the clutch members occurs even though one of said members is momentarily retarded against free rotation. In order to permit this fractional member rotation, or momentarily independent rotation of the clutch members, the thrust ring 73 yields against the yielding resistance of springs 77'.

The automatic disconnection of the clutch members is effected through a pair of knock out rods 77 and 78 which are respectively disposed in the passageways 40 and 41 and extend through the clutch body member 11 from the shifter ring or slider 47 to a point just short of the inner face of the clutch driving member receptacle base 14, as illustrated in phantom lines in Fig. 5. The said inner end of the knock out rods 77 and 78 are normally disposed in the space between the projections or cams 19 and 20.

Figure 7:
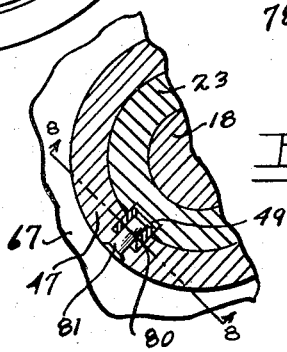
Fig. 7 is a fragmentary sectional view as seen from line 7—7 on Fig. 5.

The outer ends of the knock out rods 77 and 78 are, respectively, disposed in a suitable slot 79 and 80 projecting inwardly into the clutch actuating slider and are each secured to said slider by a rivet 81 as illustrated in Fig. 7.

The driven clutch member 11 is keyed to the shaft 18 through the key 82 whereby the shaft 18 receives its rotation.

In practice and with the parts in driving connection, as illustrated in Fig. 1, and upon the transmittable torque point, the load limit, being reached one or the other of the clutch elements will be retarded in its rotation thereby permitting the other clutch element to continue at normal speed. This continued movement, after a partial revolution as above pointed out, causes an engagement of one of the cam faces 21 or 22 of the projections or cams 19 and 20 to engage with the inner rounded ends of the knock out rods 77 and 78 and thereby actuate said rods to the right as seen in Figs. 1, 4 and 5 for thereby shifting the shifter member from its solid line position in Fig. 4 to its phantom line position therein, or shift said shifter from said solid line position in Fig. 4 to its solid line position in Fig. 5, for thereby releasing the clutch plates actuating levers 42 and permitting the springs 61 and 62 to expand and relieve all driving pressure between the driven clutch plates 29, 30 and 31 and the composite driving clutch plates 32 and 33.

From the foregoing it will be noted that there has been provided an adjustable thrust member assembly, or backing up nut, which may be given any amount of radial or angular adjustment, even though quite minute, whereupon the thrust assembly or nut may be securely locked in position by the locking dog screw 72. By this construction even the slightest wear on the friction plates 29 to 33, inclusive, may be compensated for without deviating from the desired load point transmittable through the clutch.

The modification illustrated in Fig. 8 contemplates, instead of securing or riveting the knock out rods 77 and 78 to the slider 47, the provision of a socket or notch 83 in the slider 47 at diametrically opposite points, one for each knock out rod 77 and 78, into which the outer ends of said knock out rods are disposed. It is to be understood that said sockets 83 are respectively opposite a passage way 40 or 41.

In operation the knock out rods cannot be separated from their sockets since the shifting of the shifter for rendering the clutch operative will shift the knock out rods correspondingly while the operation of the knock out rods by the cams or projections 19 and 20 will accordingly actuate the slider 47, unless the slider is forcefully shifted outwardly beyond its clutch inoperative position; a condition not within the normal functioning of the device of the present invention.

What is claimed is:

1. In a friction clutch the combination of a driving clutch member, a driven clutch member, one of said clutch members including a cup-like receptacle having a base and a peripheral rim, the second of said clutch members including a body portion with a thrust reacting flange within the cup-like receptacle rim, a second thrust member on said second clutch member body portion including a yieldable thrust ring yieldably carried by a nut threaded on said second clutch member body portion adjustable toward and from the thrust reacting flange to establish the torque point of the clutch, said nut being vertically slit on one side of its axis to provide opposed portions, a dog screw carried by one of said nut portions and impinging against the other for actuating the portions of the nut on each side of the slit relative to one another for clamping the nut, and thereby the yieldable thrust ring, in adjusted positions, friction clutch plates associated with said clutch members, oscillatably mounted members carried by said second clutch member operable to effect a pressing engagement of said friction plates with respect to one another and a driving connection of said plates against said second thrust member yieldable thrust ring, a slider on said second clutch member body portion forwardly operable for actuating said oscillatably mounted members for pressing the friction clutch plates into operative driving engagement between said thrust reacting flange and said second thrust member yieldable thrust ring, knock-out rods carried by and extending from the slider within the first clutch member peripheral rim and having their free ends adjacent the base of the first clutch member cup-like receptable, and cams inwardly projecting from said first clutch member cup-like receptacle base engaging, upon the clutch reaching the torque overload point, and actuating said knock-out rods for rearwardly actuating the slider and releasing the clutch plates from driving engagement.

2. In a friction clutch the combination of a driving clutch member, a driven clutch member, one of said clutch members including a cup-like receptacle having a base and a peripheral rim, the second of said clutch members including a body portion with a thrust reacting flange within the cup-like receptacle rim, a second thrust member on said second clutch member body portion including a yieldable thrust ring yieldably carried by a nut threaded on said second clutch member body portion adjustable toward and from the thrust reacting flange to establish the torque point of the clutch, said nut being vertically slit on one side of its axis to provide opposed portions, a dog screw carried by one of said nut portions and impinging against the other for actuating the portions of the nut on each side of the slit relative to one another for clamping the nut, and thereby the yieldable thrust ring in adjusted positions, friction clutch plates associated with said clutch members and disposed within said first clutch member cup-like receptacle rim, said thrust reacting flange and innermost friction clutch plate being spaced from one another to provide a space therebetween, freely mounted levers carried by the second clutch member body portion with each of said levers having a portion disposed in the space between the thrust reacting flange and said innermost friction clutch plate oscillatable to take up said space and effect a compression of and a driving connection between the clutch plates and the thrust reacting flange and the second thrust member, a slider on said second clutch member body portion forwardly operable for actuating said oscillatably mounted levers for pressing the friction clutch plates into operative driving engagement between said thrust reacting flange and said second thrust member yieldable thrust ring, knock-out rods carried by and extending from the slider within the first clutch member peripheral rim and having their free ends adjacent the base of the first clutch member cup-like receptacle, and cams inwardly projecting from said first clutch member cup-like receptacle base engaging, upon the clutch reaching the torque overload point, and actuating said knock-out rods for rearwardly actuating the slider and releasing the clutch plates from driving engagement.

3. In a friction clutch the combination of a driving clutch member, a driven clutch member, one of said clutch members including a cup-like receptacle having a base and a peripheral rim, the second of said clutch members including a body portion with a thrust reacting flange within the cup-like receptacle rim, a second thrust member on said second clutch member body portion including a nut threaded on said second clutch member body portion adjustable toward and from the thrust reacting flange to establish the torque point of the clutch, said nut being vertically slit on one side of its axis to provide opposed portions, a dog screw carried by one of said nut portions and impinging against the other for actuating the portions of the nut on each side of the slit relative to one another for clamping the nut in adjusted positions, friction clutch plates associated with said clutch members and disposed within said first clutch member cup-like receptacle rim, said thrust reacting flange and innermost friction clutch plate being spaced from one another to provide a space therebetween, freely mounted levers carried by the second clutch member body portion with each of said levers having a portion disposed in the space between the thrust reacting flange and said innermost friction clutch plate oscillatable to take up said space and effect a compression of and a driving connection between the clutch plates and the thrust reacting flange and the second thrust member, a slider on said second clutch member body portion forwardly operable for actuating said oscillatably mounted levers for pressing the friction clutch plates into operative driving engagement between said thrust reacting flange and said second thrust member, knock-out rods carried by and extending from the slider within the first clutch member peripheral rim and having their free ends adjacent the base of the first clutch member cup-like receptacle, and cams inwardly projecting from said first clutch member cup-like receptacle base engaging, upon the clutch reaching the torque overload point, and actuating said knock-out rods for rearwardly actuating the slider and releasing the clutch plates from driving engagement.

4. In a friction clutch the combination of a driving clutch member, a driven clutch member, one of said clutch members including a cup-like receptacle having a base and a peripheral rim, the second of said clutch members including a body portion with a thrust reacting flange within the cup-like receptacle rim, a second thrust member on said second clutch member body portion including a nut threaded on said second clutch member body portion adjustable toward and from the thrust reacting flange to establish the torque point of the clutch, means locking said nut in its adjusted position on the second clutch member body portion, friction clutch plates associated with said clutch members and disposed within said first clutch member cup-like receptacle rim, said clutch plates being so positioned with respect to the thrust reacting flange as to provide a space between said thrust reacting flange and innermost friction clutch plate, freely mounted levers carried by the second clutch member body portion with each of said levers having an operating portion and an angular portion disposed in said space between the thrust reacting flange and said innermost friction clutch plate, a slider on said second clutch member body portion forwardly operable for operative engagement with the freely mounted levers operating portions for operating the same and oscillatably actuating the levers angular portions for pressing the friction clutch plates into operative driving engagement between said thrust reacting flange and said second thrust member, knock-out rods carried by and extending from the slider within the first clutch member peripheral rim and having their free ends adjacent the base of the clutch member cup-like receptacle, and cams inwardly projecting from said first clutch member cup-like receptacle base engaging, upon the clutch reaching the torque overload point, and actuating said knock-out rods for rearwardly actuating the slider and releasing the clutch plates from driving engagement.

References Cited in the file of this patent

UNITED STATES PATENTS

| | | |
|---|---|---|
| 1,753,085 | Peterson | Apr. 1, 1930 |
| 1,924,108 | Conway | Aug. 29, 1933 |
| 2,457,801 | Ball | Jan. 4, 1949 |
| 2,561,833 | Wolf | July 24, 1951 |
| 2,773,370 | Intraub et al. | Dec. 11, 1956 |

FOREIGN PATENTS

| | | |
|---|---|---|
| 251,486 | Switzerland | Aug. 2, 1948 |